Feb. 16, 1943.　　　P. J. COLLINS　　　2,311,303
ENGINE MOUNTING AND CONTROL
Original Filed July 22, 1933　　4 Sheets-Sheet 1
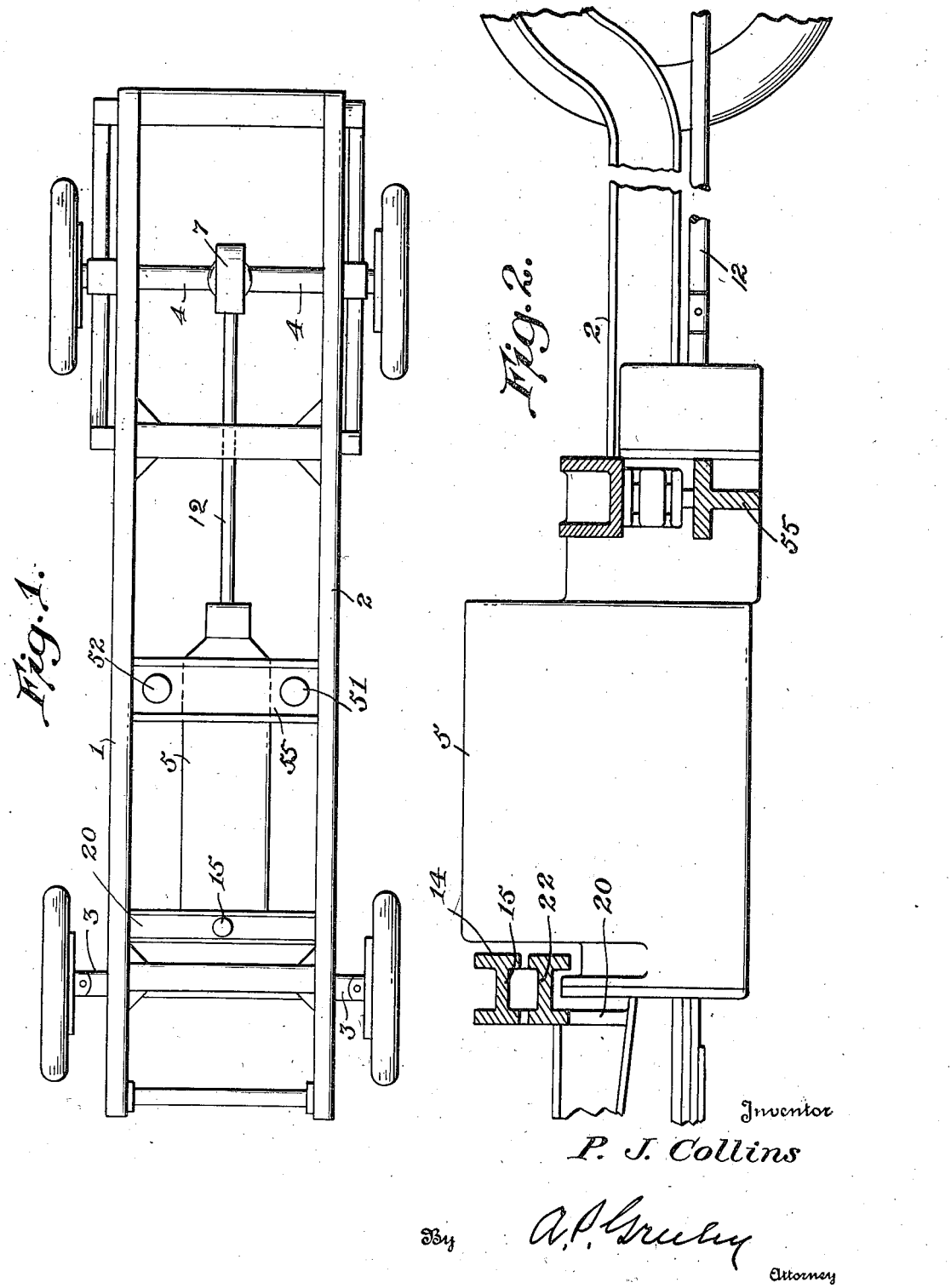
Inventor
P. J. Collins
By A. P. Greeley
Attorney Feb. 16, 1943.  P. J. COLLINS  2,311,303
ENGINE MOUNTING AND CONTROL
Original Filed July 22, 1933.  4 Sheets-Sheet 2
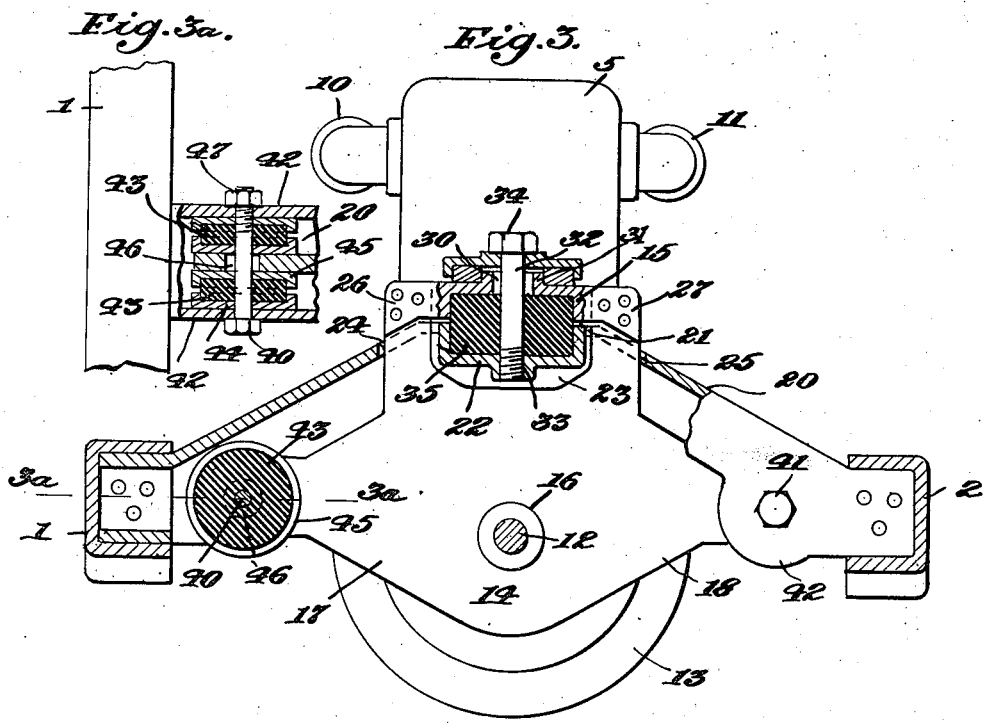
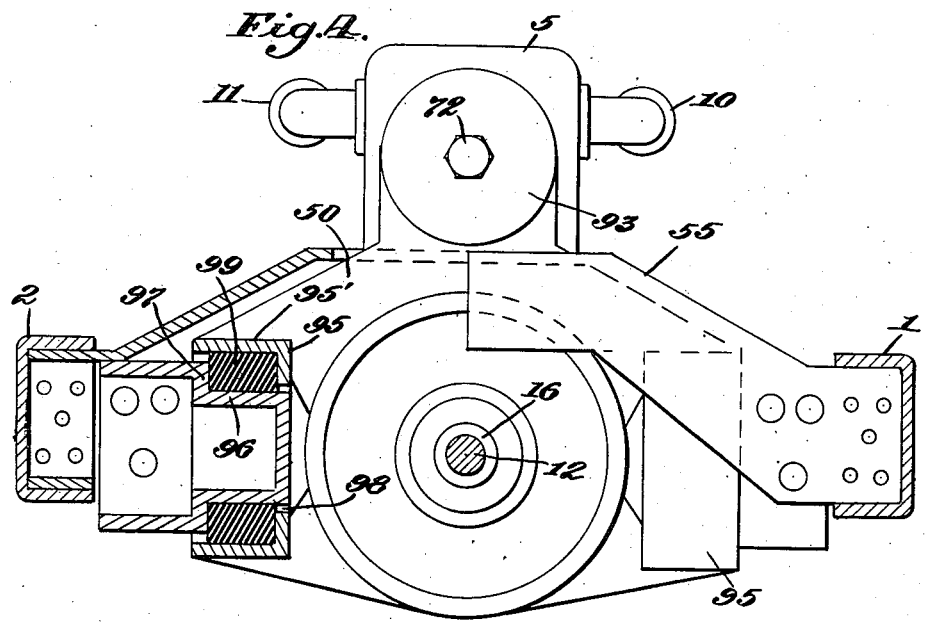
Inventor:
P. J. Collins,
by A. P. Greeley
Att'y.

Feb. 16, 1943.  P. J. COLLINS  2,311,303
ENGINE MOUNTING AND CONTROL
Original Filed July 22, 1933  4 Sheets-Sheet 3
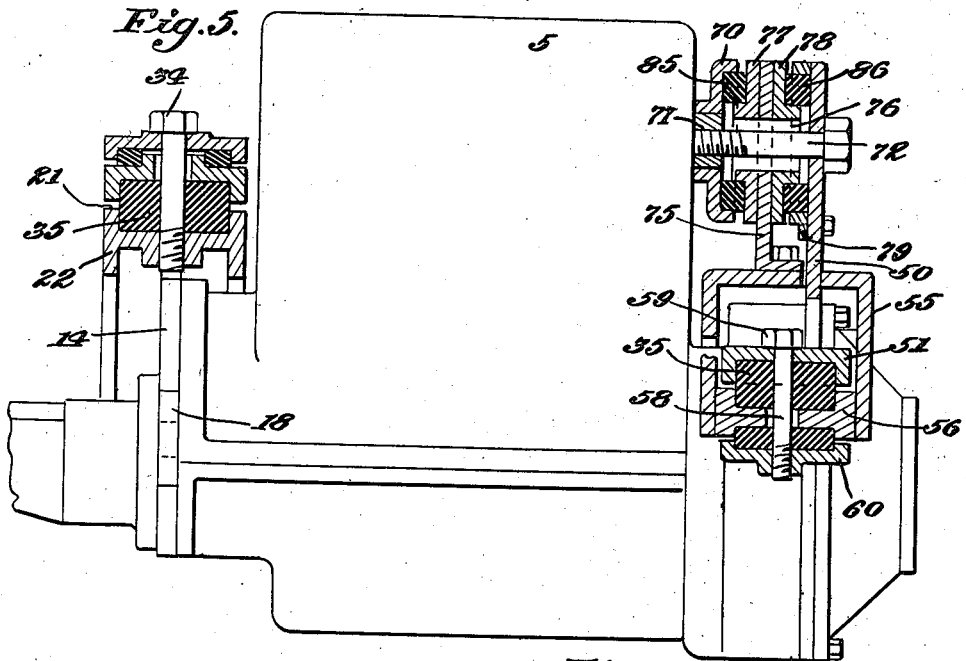
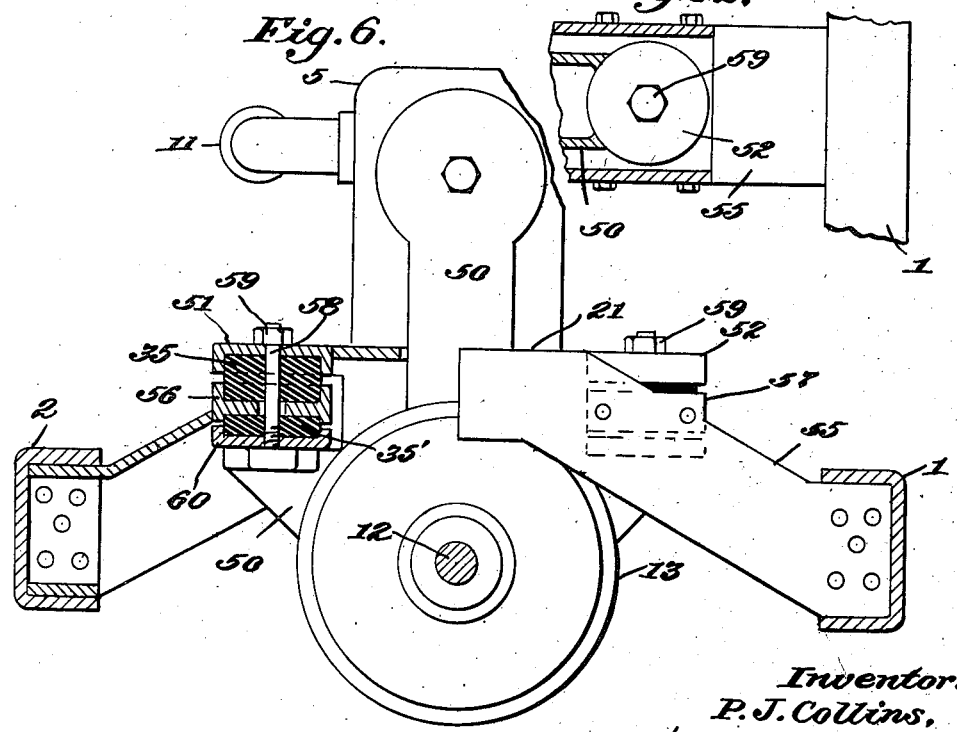
Inventor:
P. J. Collins,

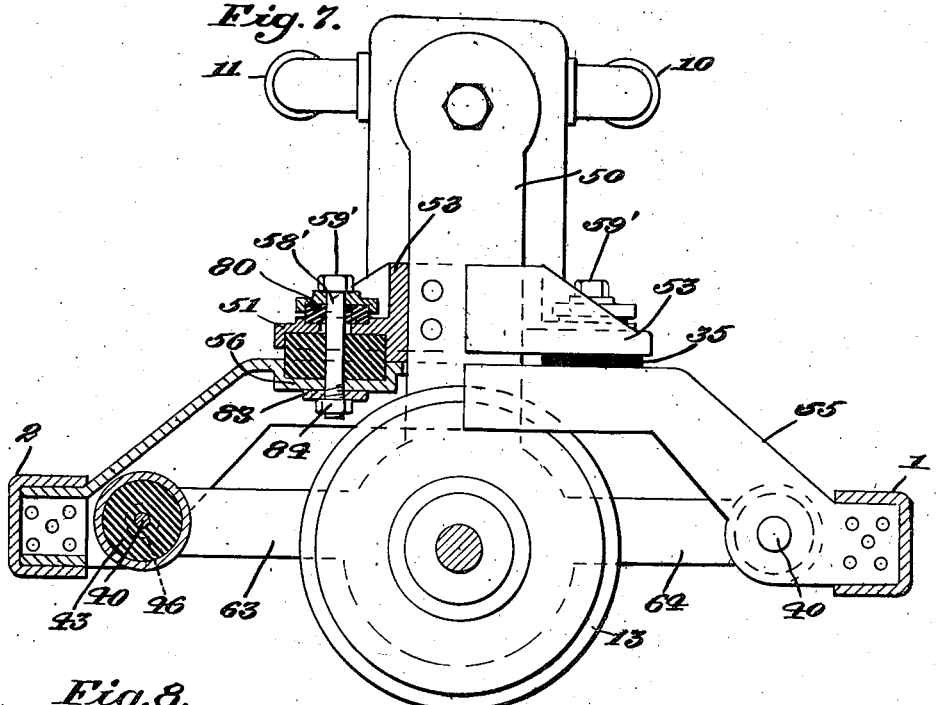
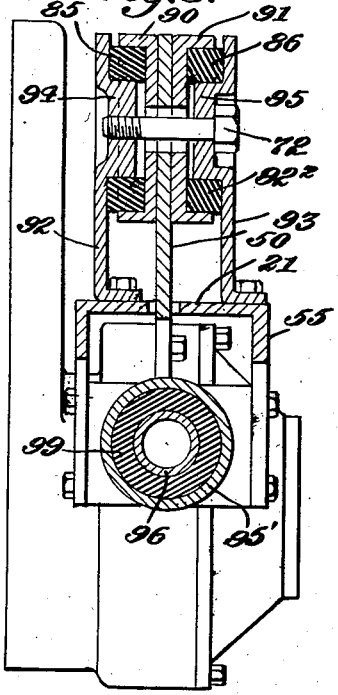 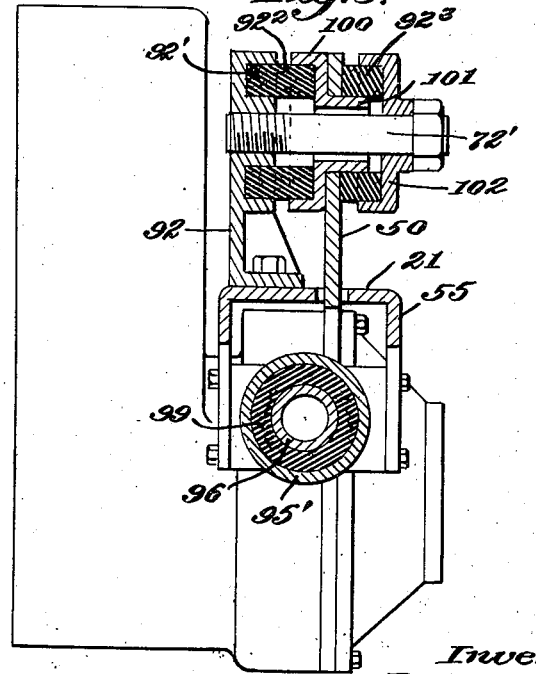

Patented Feb. 16, 1943

2,311,303

UNITED STATES PATENT OFFICE 2,311,303

ENGINE MOUNTING AND CONTROL

Patrick J. Collins, Newark, N. J.

Application July 22, 1933, Serial No. 681,788
Renewed May 20, 1937

7 Claims. (Cl. 248—7)

The invention herein disclosed is a new combination of elements through which an internal combustion engine is suspended for oscillation about an axis above its centre of mass.

Internal combustion engines and particularly internal combustion engines of the automobile type have inherent vibrations varying in frequency, volume and intensity with the normal variation of the speed-torque characteristics of the engine, which are augmented during the operation of the change-speed gearing necessarily interposed between the engine and the driving wheels of the vehicle. This variation of the speed and torque of the engine, caused by acceleration and deceleration of the vehicle, and more particularly by the necessary disconnecting and reconnecting of the power circuit between the engine and the driving wheels during the period of changing gear ratio, develops a decidedly destructive form of vibration which is intensified by the movement of the inertia mass of the piston structure. This is particularly true of the conventional engine mounting as the supporting elements are located below the horizontal plane of the crank shaft which, of course, materially increases the danger of overturning the vehicle while rounding curves in the roadway, or operating over a curved path, or suddenly diverting the vehicle from a straight course.

Various constructions intended to lessen the transmission of these engine vibrations to the chassis or body of the vehicle have been devised, such as, for instance, the mounting of the engine on supporting cushions of rubber or other resilient material which are usually located below the horizontal plane of the crank shaft, so that the outward pressure caused by centrifugal force on the upwardly extending portion of the engine as the vehicle rounds a curve in the roadway is an outward pressure on the engine mass above its point of suspension, resulting frequently in the overturning of the vehicle.

One of the objects of this invention is to arrange the suspension and control elements so as to maintain a predetermined degree of resilience under all conditions of road, grade and speed, within the normal speed of the vehicle, thus securing a smooth and noiseless operation of the vehicle at normal speed and safety when the vehicle is operated above its normal speed.

Another object of the invention is to arrange the location of the suspension and control elements so as to preclude synchronism of said elements during the entire speed-range of the engine thus precluding any form of synchronized vibration reaching the chassis or body of the vehicle.

The principal object of this invention is to provide a construction and combination of elements through the medium of which an internal combustion engine is resiliently suspended in balance, so that it will be free to oscillate about an axis above its centre of mass, and thus neutralize the reaction of the power stroke event of its cycle which eliminates torque reaction and precludes excessive oscillation, and permits centrifugal force to automatically balance and control the vehicle and power-plant-unit, so that when the vehicle is operating over a curved path the lower heavier portion of the engine below said axis will be moved laterally by centrifugal force, forcing the upwardly extending portion of the engine to incline toward the inner side of the chassis and apply downward pressure on the inner wheels, which of course materially increases the safety factor of the vehicle, under all conditions of road, grade or speed.

A further object of the invention is to provide a suspension and control system having as a part of it a plurality of resilient non-metallic elements with manually controlled means for varying their resilience. A further object of the invention is to provide means for controlling the vertical and horizontal movement of the engine under all operating conditions.

A still further object of this invention is to provide means additional to the suspension and control means for such movement as may be normally permitted in the design and construction of the resilient material between the suspending and controlling elements.

A further object of the invention is to so arrange and locate the suspending and controlling elements of the system that the resilient material will be under tension and compression simultaneously with a slight variation while the vehicle is rounding curves or operating over a curved path.

With the above objects and other objects hereinafter explained in view, my invention consists in the construction and combination of elements hereinafter described and claimed.

Referring to the drawings:

Figure 1 is a plan view of the conventional three point engine mounting.

Figure 2 is a side view of the invention applied to a high speed engine.

Figure 3 is a cross-sectional view through the means for suspending the front end of the engine as shown in Figure 1, showing laterally extending elements for controlling the oscillation of the engine.

Figure 3a is a horizontal sectional view on line 3a—3a of Figure 2.

Figure 4 is a rear end view partly in cross section of the suspending and controlling means for the rear end of an engine of the short stroke type showing the suspending and control members but without the usual change speed gearing.

Figure 5 is a side view of the engine showing the front end suspending element in central vertical longitudinal section and showing the control elements at the rear end in central vertical section and showing a supporting element similar to Figure 6.

Figure 6 is a rear end view partly in vertical cross section of a modified form of suspending means for the rear end of an engine in which the elements may be located and arranged at any desired angle to suit the requirements of the design and construction of the engine.

Figure 6a shows a modification of the suspending element shown in Figure 7, but intended to be located below the horizontal plane of the crank shaft as shown in Figure 2.

Figure 7 is a view similar to Figure 3 but showing the invention arranged for the suspension and control of a long stroke engine and showing two cups.

Figure 8 is a side view of the rear portion of an engine similar to Figure 5, but showing a modified construction of the control elements and showing the supporting element as in Figure 4, and Figure 9 is a vertical longitudinal cross-sectional view of Figure 4 showing the suspension and control elements.

In the drawings 1 and 2 indicate the side bars of the chassis of a motor vehicle having front axle 3, rear axle 4, drive shaft 12 and differential 7. 5 indicates an internal combustion engine arranged to drive the rear axles.

The engine 5 comprises the usual cylinder block with manifolds 10 and 11, engine shaft 12, and fly wheel housing 13. Secured to the front end of the cylinder block is an element which may be of any desired construction but shown here as a vertical plate 14 having near its top and in line substantially with the longitudinal central plane of the engine shaft an inverted cup 15. Plate 14 as shown in Figure 3 extends downward below, and has an opening 16 in it for the engine shaft and starting crank bearings and has laterally extending arms 17 and 18 which may be integral with or fixed to said plate for a purpose hereinafter explained.

20 indicates a cross bar secured at its ends to the side members 1 and 2 of the chasis. This cross bar preferably extends upward above the horizontal plane of the chassis frame and may, if desired, extend to a point midway between the crank shaft and the combustion chamber of the engine. It may be of any desired shape in cross section; for instance, may be of an inverted channel shape as shown in Figures 3 and 4, or may be of a construction as shown in Figure 2. Whatever its shape, it has at its top a preferably horizontal portion 21 of such area as may serve to carry a cup 22 corresponding in shape and arranged opposite to and in register with inverted cup 15 carried by arms 26 and 27 secured to plate 14. Plate 14 is cut away at 23 to permit cup 22 to extend into its upper edge and plate 20 near its horizontal portion 21 is slotted as indicated at 24 and 25 to permit arms 26 and 27 to pass through it.

Inverted cup 15 has at its centre an opening 30 preferably having an upwardly extending ring 31 about it and adapted to permit bolt 32 to pass freely through it and to move within it. Bolt 32 is screw threaded at its lowed end in an opening 33 in the centre of the bottom of cup 22 and has a head or nut 34 at its upper end.

Within cup 22 and extending up into inverted cup 15 is a mass 35 of resilient material such as rubber, having a central hole through it for bolt 32. This resilient material completely fills cup 22 and inverted cup 15 and is of such vertical dimension as to hold the edges of these cups a substantial distance apart. The bolt 32 serves to compress the mass 35 to any extent desired.

In Figure 4 and in Figures 8 and 9, plate 50 secured to the engine, is provided with laterally extending arms each carrying a disc 95 having at its periphery an outwardly extending flange 95$^1$ adapted to receive within it a ring 99 of resilient material carried by the inner portion 96 of a cylindrical member, the outer portion 97 of which is of larger diameter than portion 96 so as to form an abutment against which the outer face of resilient ring 99 may rest. This outer portion 97 is secured to cross bar 55. Disc 95 has in its an opening 98 into which the end of the inner portion 96 of the cylindrical member may extend. This ring 99 of resilient material resists oscillation of the engine on axis 72 so that in rounding a curve the upper portion of the inner ring is compressed and at the same time the lower portion of the outer ring is compressed permitting expansion of the lower portion of the inner ring and of the upper portion of the outer ring. There is also simultaneous lateral compression and expansion of the rings, Extending across the chassis and secured at its ends to the side members 1 and 2 at the rear end of the engine (see Figures 6 and 7) is cross bar 55, here shown as of inverted channel shape, corresponding in general construction to cross bar 20 at the front.

Inverted cups 51 and 52 in the design and construction shown in Figure 6 are carried by a laterally extending portion of plate 50 to which is secured at the rear end of the engine block, an upwardly extending arm. Inverted cups 51 and 52 are in line respectively with cups 56 and 57 on cross bar 55 so as to carry between each cup and its inverted cup a mass 35 of resilient material such as rubber. Cups 56 and 57 as shown in Figure 6 are each formed with an inverted cup or recess in the underface of its bottom to hold between it and a cup 60 which is carried by the bracket on plate 50 a second mass 35$^1$ of resilient material. Stud 58 is carried by laterally extending portion on plate 50 and extends upward through cup 60, cup 56, and inverted cup 51 and carries on its upper end nut 59. By rotating nut 59 the compression exerted on resilient masses 35 and 35$^1$ may be regulated. It will, of course, be understood that the construction as regards the cups and the resilient masses is the same at the other end of the plate 50 as at the end shown in cross section in Figure 6.

In the construction shown in Figure 7 cup 56 is shown as formed by a depression in the top plate of cross bar 55 and inverted cup 51 is shown as carried by laterally extending arm 53 secured to an arm which extends upward from plate 50.

Cup 56 and inverted cup 51 each has a central opening for bolt 58$^1$ which passes through resilient material 35 and is shown provided at its upper end with head 59¹. At its lower end bolt 58¹ is provided with nut 84 which bears against washer 83 which bears against the under face of cup 56. By screwing up nut 84 resilient mass 35 may be compressed. The resilient material 80 yieldingly prevents such lateral movement of the upper portion of bolt 58¹ as may be permitted by the diameter of the opening in the bottom of inverted cup 51 through which it passes. Cups 56 and 57 with inverted cups 51 and 52 in the construction shown in Figure 7 and the masses of resilient material between them being less widely separated than in the construction shown in Figure 6 on each side of the median line, that is, the vertical plane of the axis of the engine shaft. This construction may be used at the front end of the engine as indicated in broken lines on Figure 7.

Laterally extending arms 17 and 18 of plate 14 at the front end of the engine, and laterally extending arms 63, 64, of plate 50 at the rear of the engine, carry resilient element for controlling the oscillation of the engine. These devices each consist of discs 43 of resilient material each held between cupped discs 44, 45, carried on bolt 40 which extends through openings 41 in the side flanges 42 of the cross bar 20 and also extends through an opening 46 in the end of arm 17 (or 18) of such size as to permit free movement of the arm relative to the bolt.

The upwardly extending element of plate 50, the lower portion of which is secured to the engine block so as to move with it, has near its upper end an opening to receive a bolt 72, the forward end of which is threaded into an opening 71 in the centre of a cup 70 which in the construction shown in Figure 5 is fixed to the rear end of the engine block although it may be arranged as shown in Figures 8 and 9, which show the preferred forms. Between cup 70 and the upwardly extending arm of plate 50 is an arm 75 which is rigidly secured to the cross bar 55 and has, concentric with the opening for bolt 72 in cup 70 and in upwardly extending arm of plate 50, an opening 76 of such relatively large diameter as to permit movement of arm 50 and bolt 72. Interposed between cup 70 and disc 77 is a mass of resilient material 85 in ring form which will float on the central boss of disc 77 and the periphery of cup 70 when bolt 72 is rotated to cause the rear face of disc 77 to bear against arm 75, and between the rear face of arm 75 and the front face of plate 50 is a mass of resilient material 86 in ring form like 85 fitting a cup 79, fixed to plate 50 which bears against arm 75. By rotating bolt 72 resilient rings 85 and 86 will be caused to force rings 77 and 78 against the opposite faces of arm 75 and thus control the oscillation of the engine. Arm 75, discs 77 and 78 may be made rigid thus securing a modification of suspension and control as disclosed in Figure 9, or they may be arranged as in Figure 8.

In Figure 8 a modified construction of the controlling means is shown in which the forward resilient ring 85 has its front face bearing against an arm 92 which extends upward from and is secured at its lower end to cross bar 55, the ring being carried on a rearwardly projecting boss 94. Carried by ring 85 is a cup or flanged disc 90, which bears against the upwardly extending arm of plate 50. Against the rear face of this arm bears the front face of flanged disc 91, against the rear face of which is arranged resilient ring 86 which is carried on boss 95 on the upper end of arm 93 which extends upward from and is secured at its lower end to cross bar 55. Bolt 72 in this construction extends through an opening in boss 95 of arm 93 in which it fits closely, through openings of relatively large diameter in disc 91, arm of 50 and disc 90, and has its forward end screw threaded and extending into threaded opening in boss 94 of arm 92.

Rotation of bolt 72 will compress the resilient rings against discs which bear frictionally against the arm extending upward from plate 50 secured to the engine with the same effect as in the construction shown in Figure 5 except that the upwardly extending arm of plate 50 is clamped between friction discs carried by the cross bar of the chassis while in the construction shown in Figure 5 an arm extending upward from the cross bar is clamped between discs carried by upwardly extending arm of 50 and by the cylinder block of the engine.

Figure 9 shows in longitudinal vertical section the construction shown in end view in Figure 4 showing the axis of oscillation and the lower supporting elements in vertical section. In this construction supporting element 92 carried by cross bar 55 has at its rear face an annular recess 92¹ in which is secured the forward end of a resilient ring 92² the rear end of which carries a flanged disc 100 carried by a rearwardly extending hub 101 on which is received the upper end of the arm of 50 and the front end of resilient ring 92³, the rear end of which bears against the front face of flanged disc 102 through the centre of which extends bolt 72¹. Bolt 72¹ is shown in this figure as of larger diameter than bolt 72 of Figures 5 and 8 so as to be better adapted to serve as a substantial axis on which the engine may oscillate as in the construction shown in Figure 5, and extends through the hub of disc 100 and has its screw threaded forward end extending into a threaded opening in supporting element 92.

The opening in hub 101 is of such diameter relative to the diameter of bolt 72¹ as to permit the arm of 50 carried by the hub and bolt 72¹ to have movement relative one to the other, this relative movement of the hub and bolt being controlled by the resistance of the resilient material of which rings 92² and 92³ are composed, this resistance being modified by the pressure on the ring exerted by rotation of bolt 72¹.

The axis of oscillation may be arranged in any suitable manner to meet the requirements of the service for which the engine might be designed, and the resilient suspending elements may be arranged at any radial angle to the crank shaft, and thus avoid synchronism of the suspending and controlling elements. In any case it is preferably terminated on or above the horizontal plane of the axis of rotation of the crank shaft and close to the fly wheel end, as disclosed in the drawings of this application.

By varying the resilience of the suspending elements to a greater or less extent the oscillation of the engine may be controlled as desired.

In the construction shown in Figure 5 the rear supporting elements are not bolted within the inverted cross bar as they may be located and arranged in any suitable manner to meet the requirements of the design and construction of the engine and motor car. For instance, if the engine is designed for high power at moderate speed it is usually of the long-stroke type, in which case I prefer to locate the rear supporting elements close to the fly wheel housing; if the engine is designed for high speed it is usually of the medium or short stroke type, particularly so if of the vertical multi-cylinder type such as an eight-cylinder vertical engine. In that event the rear supporting elements may be located at any desirable point between the fly wheel housing and the rear end of the change speed gear box. While the arms of the suspending and controlling elements are shown substantially vertical and horizontal, it will be understood, of course, that they may be located at any angle desired and at any radial distance from the axis of the crank shaft. The supporting elements shown in Figures 4, 8, and 9 may be used instead of the rear elements shown in Figure 5 and at any location as above stated.

The cross bar shown at the rear end of the engine in Figure 1 will permit the suspending and controlling elements to be connected to the fly wheel housing or the transmission box as desired. The location of the suspending and controlling elements as indicated in Figure 2 is without the upwardly extending element for the front end of the engine as the engine may be of the one-point or two-point front suspension, depending on whether the engine to be suspended is of the short stroke, medium stroke, or long stroke, the suspending elements in any case being so located and arranged that the axis of oscillation will be parallel with the longitudinal central line of the chassis. Of course, the rear supporting elements shown in Figures 4, 8 and 9, may be used instead of those shown in Figure 5, and at any of the locations first above described.

The suspending means of Figure 6a is particularly adapted for arrangement above the horizontal portion 21 of cross bar 55 as is shown in Figure 7, or below the horizontal plane or this horizontal portion as the suspending means in Figure 6 is shown. The suspending means shown in Figure 7 as at the rear of the engine may if desired be used at the front end of the engine in place of the single suspending element shown in Figure 3.

It will, of course, be understood that I do not desire to be limited to the precise construction and arrangements shown. Instead of a single support unit at the front of the engine, two units may be used.

Having thus described my invention, what I claim is:

1. In a motor vehicle, a chassis, an internal combustion engine, means mounted on the chassis resiliently suspending the engine at its front and rear ends for oscillation about an axis above the centre of mass of the engine, whereby when the vehicle is moving in a curved path the engine will be moved by centrifugal force, and means for utilizing said movement of the engine to increase the downward pressure on the inner side of the chassis and decrease the pressure on its outer side.

2. In a motor driven vehicle, a chassis frame, an internal combustion engine, means mounted on the chassis frame for resiliently suspending the engine at its front and rear ends so that the engine will be forced to oscillate about an axis above its centre of mass and longitudinally of its crank shaft, resilient cooperative controlling elements at the rear end of the engine above and below its centre of mass operatively engaging parts on the engine and parts on the chassis frame for controlling the vertical, lateral, longitudinal and oscillatory motion of the engine during the speed-range of the vehicle.

3. In a motor operated vehicle, a chassis frame, an internal combustion motor, structures secured on the chassis frame at the front and rear ends of the motor for resiliently suspending the motor for oscillation about an axis above its centre of mass and which extends in the longitudinal-vertical plane of its crank shaft, resilient means operatively interposed between the engine and the chassis frame cooperating in the suspension and control of the engine, part of the lower elements of said resilient means extending above and below the horizontal plane of the engine shaft on each side of the median line of the engine between said median line and the side members of the chassis frame, the axis of said lower elements being arranged at an angle to the engine shaft cooperating for controlling the axis of oscillation of the engine.

4. Means for suspending an internal combustion engine within the chassis frame of a motor driven vehicle comprising a suspension structure extending across the chassis from one side member of the chassis to the other in front of the engine carrying the elements of a suspending unit, a plate secured to the front of the engine carrying the upper members of the suspending unit above and operatively connected with the elements carried by the said cross-member, and resilient material operatively interposed between said elements, said plate secured to the front of the engine having laterally extending arms below the upper portion of the said suspension structure, and means for resiliently connecting the ends of the laterally extending arms to the said cross-member 5. Means for suspending and controlling an internal combustion engine in the chassis frame of an automotive vehicle, comprising a suspension structure rigid with and extending across the chassis in front of the engine from one side member of the chassis to the other, carrying the lower elements of a suspending unit, a plate secured to the front of the engine carrying the upper elements of the said suspending unit above and in contact with the element carried by the said suspension structure, and resilient material operatively interposed between said elements, said plate secured to the front of the engine having laterally extending arms below the upper portion of the said suspension structure and means for resiliently engaging the ends of the laterally extending arms to the said suspension structure comprising downwardly extending flanges on the said structure, bolts extending through the ends of the laterally extending arms and through the downwardly extending flanges of the said structure, and resilient material operatively interposed between the ends of the laterally extending arms and the said flanges.

6. Means for controlling the axis of oscillation of an internal combustion engine within the chassis frame of a motor driven vehicle comprising a structure extending from one side member of the chassis to the other at the front end of the engine having its mid-portion extending above the horizontal plane of the chassis frame, suspending units each comprising suspending elements carried by the said structure, movable elements operatively interposed between the engine and the chassis frame above and below the horizontal plane of the engine shaft, and resilient material operatively interposed between said elements, said suspending elements being arranged on each side of the median line of the engine, and resilient suspending and controlling means at the other end of the engine.

7. In a structure for suspending an internal combustion engine within the chassis frame of an automotive vehicle a cross-member extending from one side member of the chassis to the other at the front and rear ends of the engine and forming part of the chassis frame having its mid-portion above the horizontal plane of the said chassis frame, a plate secured to the engine below the said mid-portion of the cross-member having a cross-arm above the mid-portion of the said cross-member extending laterally on opposite sides of the median line of the engine, and resilient elements operatively interposed between each of the lateral extensions of the cross-arms and the cross-member.

PATK. J. COLLINS.